(No Model.)
D. P. MOTLEY.
WHEAT CLEANER.
No. 281,115. Patented July 10, 1883.
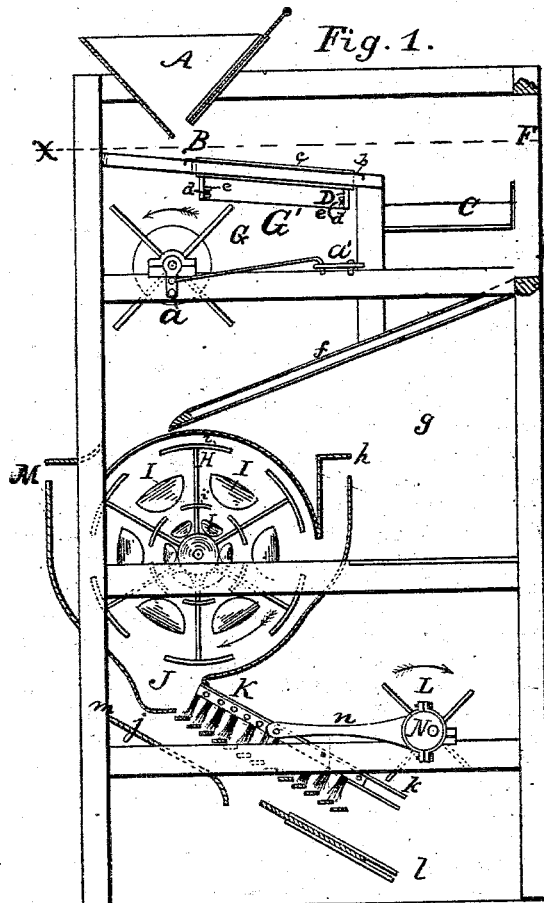
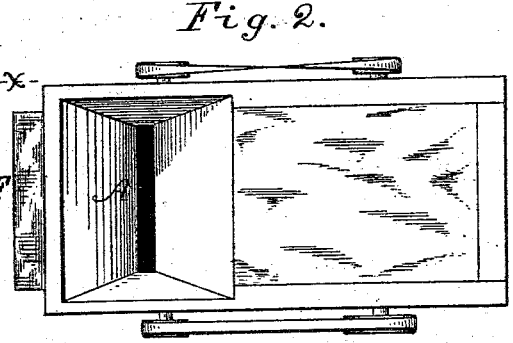
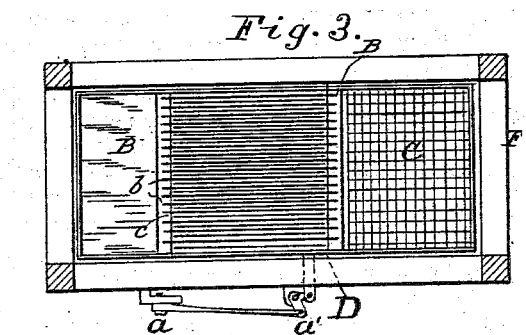
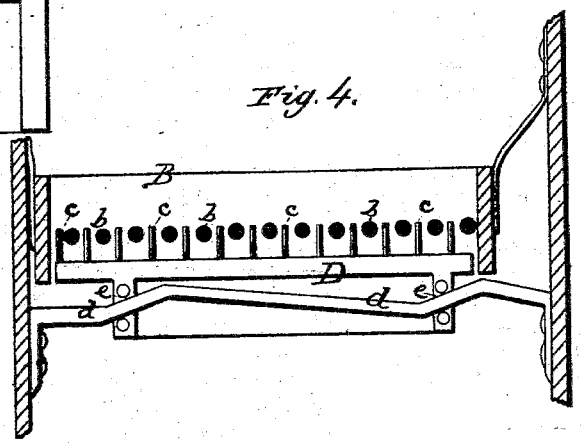
WITNESSES:
Thos. Houghton.
W. L. Stevens.
INVENTOR:
D. P. Motley
BY
ATTORNEYS.

UNITED STATES PATENT OFFICE.

DANDRIDGE P. MOTLEY, OF REXBURG, VIRGINIA.

WHEAT-CLEANER.

SPECIFICATION forming part of Letters Patent No. 281,115, dated July 10, 1883.

Application filed March 27, 1883. (No model.)

*To all whom it may concern:*

Be it known that I, DANDRIDGE P. MOTLEY, a citizen of the United States, residing at Rexburg, in the county of Essex and State of Virginia, have invented a new and Improved Wheat-Cleaner, of which the following is a specification.

This invention relates to that class of wheat-cleaning machines used to separate wheat from smut, oats, corn, &c., and to winnow it from finer seeds, like cockle, and from light dirt and dust; and it consists in the construction and combination of parts forming a wheat-cleaning machine, hereinafter described and claimed, reference being had to the accompanying drawings, in which—

Figure 1 is a side elevation, part in section, of my wheat-cleaner, the side boards inside the frame being left off to show the interior. Fig. 2 is a top view of the same. Fig. 3 is a horizontal section, part in plan at $x$ $x$, Fig. 1. Fig. 4 is a transverse vertical section, part in elevation, of my self-cleaning sieve on an enlarged scale.

A represents the hopper, into which the grain to be cleaned is poured. From this hopper the grain falls upon a sieve, B, which consists of longitudinal wires $b$ fastened at their ends in the cross-bars of the sieve. The sieve is hung to be shaken from side to side, as usual, and is slanted to allow the grain to slide away from the entrance at the hopper to the second sieve, C. To assist this sliding motion, and to agitate the grain so that the dust may fall therefrom, I provide a series of risers, $c$, consisting of strips of metal, like hoop-iron, standing edgewise between the wires $b$. These risers are secured to a frame, D, to rise and fall therewith, never falling below the level of the wires, but rising considerably above them at each lift. The lifting is done by one or more crooked cross-bars, $d$, on which the riser-frame rests. The swinging of the sieve from side to side in the act of shaking carries the risers with it; but the riser-frame, resting at $e$ $e$ on inclines of the cross-bars $d$, is caused to rise and fall at every shake, pushing its thin edges up between the wires $b$, through the grain, lifting all large or coarse matter above the grain, and so stirring the mass that the dust and fine seeds fall through into the fan-chamber G' and are blown away, and the coarse matter being on top of the grain, when it falls from sieve B to sieve C it is nearer the outlet F than the grain, so that the blast of air from fan G blows out the chaff-heads and other large light matter without carrying wheat with it. The working of the risers up between the wires of the sieve also clears the sieve of trash which gathers in and clogs all such sieves. The shaft of fan G is provided with crank $a$ to operate the bell-crank $a'$, which serves as a sieve-shaker, as usual. $f$ is another sieve, which may be provided with the risers $c$, or it may be a common sieve of any degree of fineness. The sieve C allows the grain to fall through it, but retains the coarser matter, to be blown off the top of it out of exit F. All the sieves B, C, and $f$ are connected together to be shaken by crank $a$, as described. The blast from fan G presses up through the sieves B and C, and over the latter and sieve $f$, blowing the dust and refuse out at both openings F, one above sieve C and the other below it. From sieve $f$ the grain falls into a scouring fan-chamber, H, and thence it descends through a polishing device, and is discharged from the machine by a spout; but as I propose to make other applications for patents for these polishing and scouring devices I shall not herein describe them in detail.

What I claim as my invention, and desire to secure by Letters Patent, is—

The combination, with a sieve consisting of longitudinal wires and means for shaking said sieve laterally, of thin strips adapted to rise and fall between said wires, a frame carrying said strips, and crooked bars adapted to raise and lower said strip-holding frame by the lateral motion of the sieve, substantially as shown and described.

DANDRIDGE P. MOTLEY.

Witnesses:
TH. CROXTON,
J. R. MOTLEY.